United States Patent
Lamarre et al.

(10) Patent No.: US 10,533,492 B2
(45) Date of Patent: Jan. 14, 2020

(54) COMPOUND ENGINE ASSEMBLY WITH MOUNT CAGE

(71) Applicant: Pratt & Whitney Canada Corp., Longueuil (CA)

(72) Inventors: Sylvain Lamarre, Boucherville (CA); Mike Fontaine, Boucherville (CA); Andre Julien, Ste-Julie (CA); Michael Gaul, Montreal (CA); Jean Thomassin, Ste-Julie (CA); Lazar Mitrovic, Longueuil (CA); Ilya B. Medvedev, St-Petersburg (RU); Sergey Usikov, St-Petersburg (RU); Andrey Zolotov, St-Petersburg (RU)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1002 days.

(21) Appl. No.: 15/047,362

(22) Filed: Feb. 18, 2016

(65) Prior Publication Data
US 2016/0245171 A1 Aug. 25, 2016

Related U.S. Application Data

(63) Continuation-in-part of application No. 14/864,124, filed on Sep. 24, 2015.
(Continued)

(51) Int. Cl.
- F02C 3/10 (2006.01)
- F02B 37/00 (2006.01)
- F02B 39/04 (2006.01)

(52) U.S. Cl.
CPC .............. *F02C 3/10* (2013.01); *F02B 37/004* (2013.01); *F02B 39/04* (2013.01); *F05D 2220/40* (2013.01)

(58) Field of Classification Search
CPC .......... F02B 37/004; F02B 39/04; F02C 3/10; F02C 7/20; F02C 7/25; F05D 2220/40; Y02T 50/53
(Continued)

(56) References Cited

U.S. PATENT DOCUMENTS

| | | |
|---|---|---|
| 2,249,194 A | 7/1941 | Trott |
| 2,585,968 A | 2/1952 | Schneider |

(Continued)

FOREIGN PATENT DOCUMENTS

| | | |
|---|---|---|
| CA | 2821444 | 1/2014 |
| CN | 201241751 Y | 5/2009 |

(Continued)

*Primary Examiner* — Mark A Laurenzi
*Assistant Examiner* — Paul W Thiede
(74) *Attorney, Agent, or Firm* — Norton Rose Fulbright Canada L.L.P.

(57) ABSTRACT

A compound engine assembly with an engine core including at least one internal combustion engine, a turbine section, and a compressor having an outlet in fluid communication with an inlet of the engine core. A casing is connected to the turbine section, compressor and engine core. A mount cage is connected to mounts attached to the casing between the compressor and a hot zone including the turbine section and exhaust pipe(s). The struts are separated from the hot zone by at least one firewall. The mount cage may include a plurality of struts all extending from the mounts away from the turbine section and engine core. The casing may be a gearbox module casing through which the turbine shaft is engaged with the engine shaft. The mount cage may be completely contained within an axial space with the turbine section and exhaust pipe(s) being located outside of the axial space.

20 Claims, 12 Drawing Sheets

Related U.S. Application Data

(60) Provisional application No. 62/118,914, filed on Feb. 20, 2015.

(58) Field of Classification Search
USPC .................................. 60/614, 364, 645, 716
See application file for complete search history.

(56) References Cited

U.S. PATENT DOCUMENTS

| | | | |
|---|---|---|---|
| 2,769,303 | A | 11/1956 | Lucia et al. |
| 2,774,341 | A | 12/1956 | Morse |
| 3,089,304 | A | 5/1963 | Bozzola |
| 3,138,221 | A | 6/1964 | Siegfried et al. |
| 3,200,580 | A | 8/1965 | Millar |
| 3,673,797 | A | 7/1972 | Wilkinson |
| 3,780,710 | A | 12/1973 | Przybylski |
| 3,852,963 | A | 12/1974 | Hufstader |
| 3,905,564 | A | 9/1975 | Furlano |
| 4,019,324 | A | 4/1977 | Coxon |
| 4,038,816 | A | 8/1977 | Wright |
| 4,503,683 | A | 3/1985 | Wieland et al. |
| 4,586,337 | A | 5/1986 | Fox |
| 4,599,862 | A | 7/1986 | Bergeron |
| 4,697,782 | A | 10/1987 | Ban |
| 4,742,683 | A | 5/1988 | Heminghous et al. |
| 4,815,282 | A | 3/1989 | Wilkinson et al. |
| 4,884,406 | A | 12/1989 | Kawamura |
| 4,989,410 | A | 2/1991 | Smith |
| 4,996,839 | A | 3/1991 | Wilkinson et al. |
| 5,079,913 | A | 1/1992 | Kishishita |
| 5,555,730 | A | 9/1996 | Hope |
| 6,000,210 | A | 12/1999 | Negulescu |
| 6,244,239 | B1 | 6/2001 | Sisco et al. |
| 6,308,915 | B1 | 10/2001 | Liston et al. |
| 6,354,538 | B1 | 3/2002 | Chilukuri |
| 6,408,626 | B1 | 6/2002 | Arnell |
| 6,418,722 | B1 | 7/2002 | Arnold |
| 6,516,788 | B1 | 2/2003 | Roderique |
| 6,681,575 | B2 | 1/2004 | Dellora et al. |
| 7,044,100 | B2 | 5/2006 | Stone |
| 7,055,303 | B2 | 6/2006 | Macfarlane et al. |
| 7,302,800 | B2 | 12/2007 | Klingel |
| 7,654,087 | B2 | 2/2010 | Ullyott |
| 7,694,519 | B2 | 4/2010 | Kley et al. |
| 7,748,953 | B2 | 7/2010 | Smith |
| 7,753,036 | B2 | 7/2010 | Lents et al. |
| 7,775,044 | B2 | 8/2010 | Julien et al. |
| 7,797,947 | B2 | 9/2010 | Lafont et al. |
| 3,033,094 | A1 | 10/2011 | Suciu et al. |
| 8,087,885 | B2 | 1/2012 | Suciu et al. |
| 8,191,371 | B2 | 6/2012 | Kley et al. |
| 8,683,987 | B2 | 4/2014 | Marcil |
| 8,727,270 | B2 | 5/2014 | Burns et al. |
| 9,194,232 | B2 | 11/2015 | Bolduc et al. |
| 9,581,078 | B2 | 2/2017 | Brinks et al. |
| 9,869,240 | B2 | 1/2018 | Lamarre et al. |
| 9,932,892 | B2 | 4/2018 | Thomassin et al. |
| 2005/0150483 | A1 | 7/2005 | Sorensen |
| 2005/0188943 | A1 | 9/2005 | Gonzalez et al. |
| 2006/0032225 | A1 | 2/2006 | Dyne et al. |
| 2007/0240415 | A1 | 10/2007 | Julien et al. |
| 2009/0007882 | A1 | 1/2009 | Lents |
| 2010/0005799 | A1 | 1/2010 | Nikpour |
| 2010/0199666 | A1 | 8/2010 | Vandyne et al. |
| 2010/0281880 | A1 | 11/2010 | Porte |
| 2011/0048000 | A1 | 3/2011 | Kley et al. |
| 2011/0081257 | A1 | 4/2011 | Kley et al. |
| 2011/0197849 | A1 | 8/2011 | Wright |
| 2011/0214422 | A1 | 9/2011 | VanDyne et al. |
| 2012/0257966 | A1 | 10/2012 | Boening et al. |
| 2012/0297770 | A1 | 11/2012 | Figler et al. |
| 2013/0111923 | A1 | 5/2013 | Donnelly |
| 2013/0160459 | A1 | 6/2013 | Thies |
| 2013/0199491 | A1 | 8/2013 | Gekht et al. |
| 2013/0227933 | A1 | 9/2013 | Denholm et al. |
| 2013/0227944 | A1 | 9/2013 | Denholm et al. |
| 2013/0239568 | A1 | 9/2013 | Krishnan et al. |
| 2014/0020380 | A1 | 1/2014 | Thomassin |
| 2014/0020381 | A1 | 1/2014 | Bolduc et al. |
| 2014/0116043 | A1 | 5/2014 | Hirzel et al. |
| 2014/0219836 | A1 | 8/2014 | Houst |
| 2015/0141188 | A1 | 5/2015 | Sherrill et al. |
| 2015/0275749 | A1 | 10/2015 | Thomassin |
| 2016/0201553 | A1 | 7/2016 | Jones et al. |
| 2017/0218760 | A1 | 8/2017 | Fontaine et al. |

FOREIGN PATENT DOCUMENTS

| | | |
|---|---|---|
| CN | 102022183 | 4/2011 |
| CN | 102822471 A | 12/2012 |
| CN | 103429868 A | 12/2013 |
| DE | 742824 C | 12/1943 |
| EP | 2687675 A2 | 1/2014 |
| EP | 3032075 | 6/2016 |
| GB | 2201467 | 9/1988 |
| JP | 2012092678 A | 5/2012 |
| WO | 9839563 | 9/1998 |

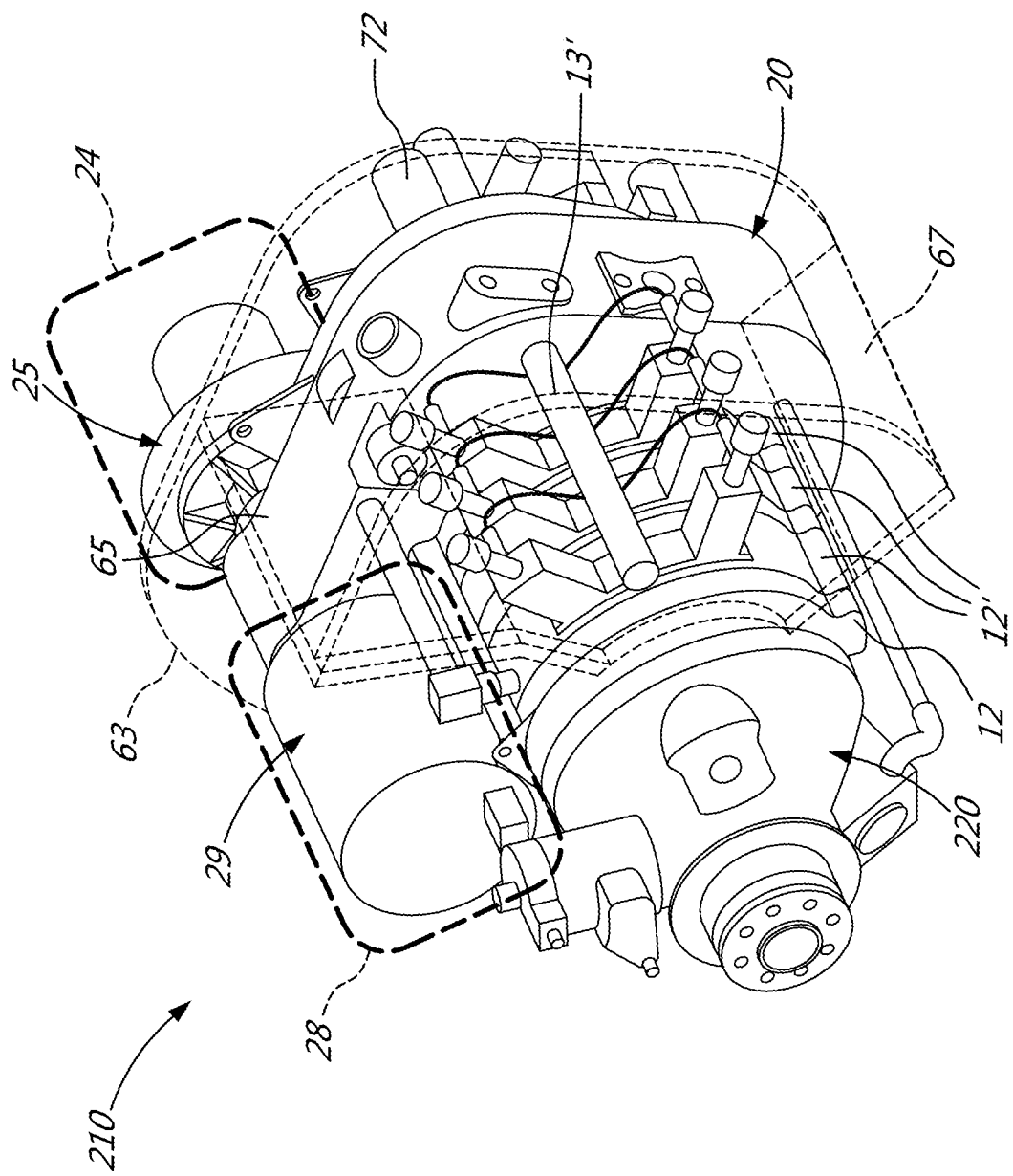

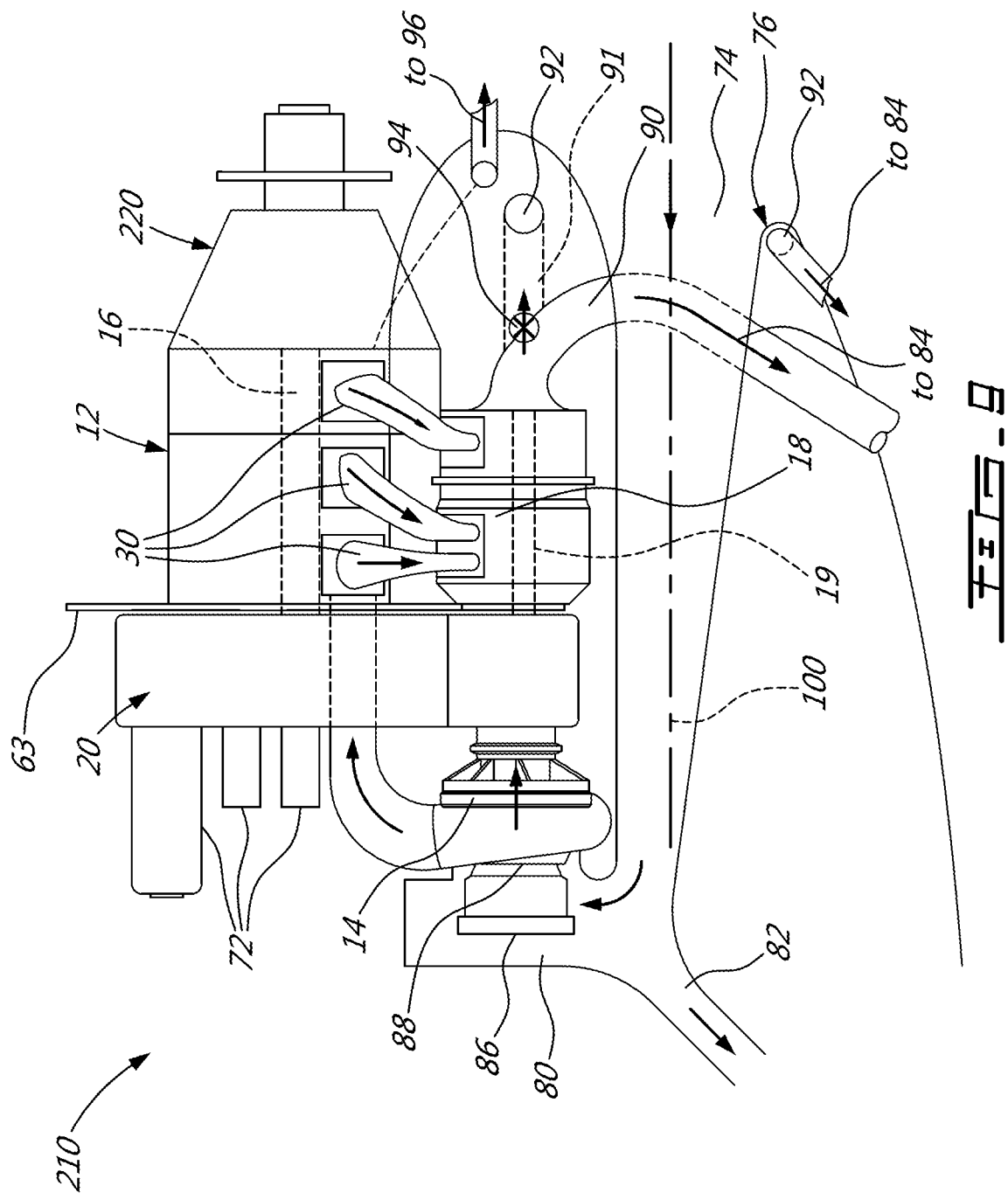

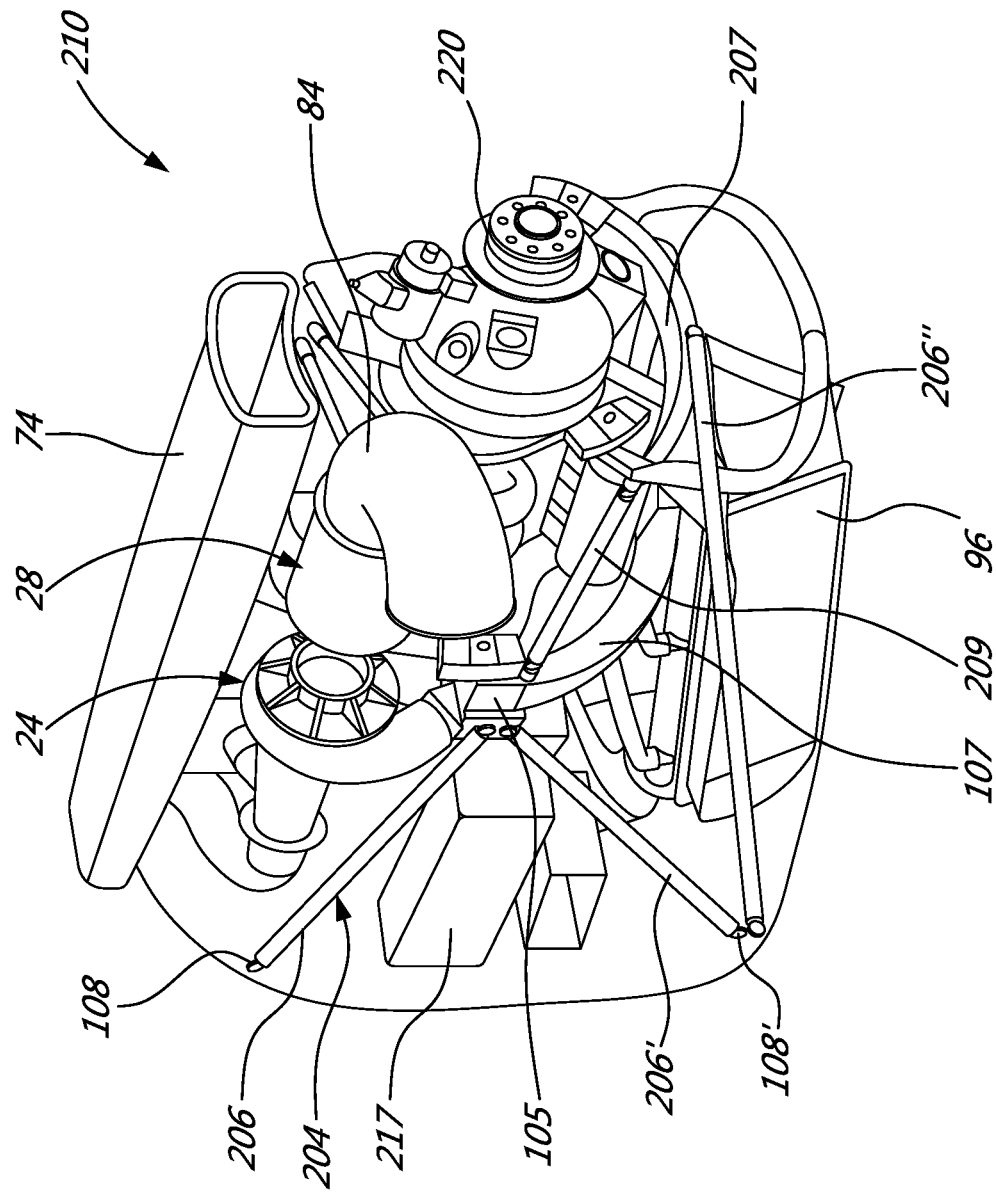

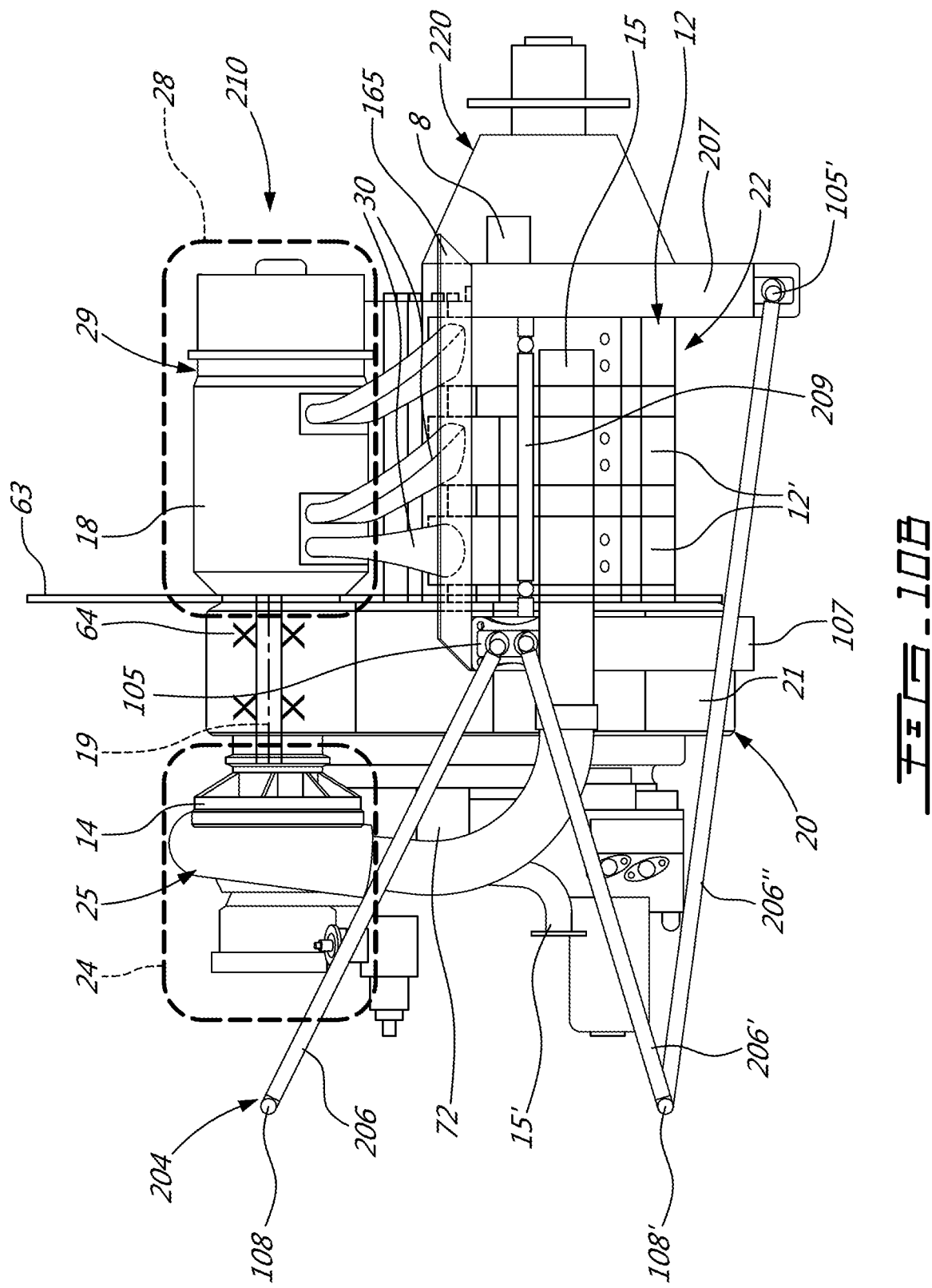

COMPOUND ENGINE ASSEMBLY WITH MOUNT CAGE

CROSS-REFERENCE TO RELATED APPLICATIONS

This application is a continuation-in-part of U.S. application Ser. No. 14/864,124 filed Sep. 24, 2015, which claims priority from U.S. provisional application No. 62/118,914 filed Feb. 20, 2015, the entire contents of both of which are incorporated by reference herein.

TECHNICAL FIELD

The application relates generally to compound engine assemblies and, more particularly, to supercharged or turbocharged compound engine assemblies used in aircraft.

BACKGROUND OF THE ART

Compound engine assemblies including a compressor used as a supercharger or turbocharger may define a relatively bulky assembly which may be difficult to fit into existing aircraft nacelles, thus creating some difficulty in adapting them for aircraft applications.

SUMMARY

In one aspect, there is provided a compound engine assembly comprising: an engine core including at least one internal combustion engine in driving engagement with an engine shaft; a turbine section having an inlet in fluid communication with an outlet of the engine core through at least one exhaust pipe, the turbine section including at least one turbine rotor connected to a turbine shaft, the turbine shaft in driving engagement with the engine shaft; a compressor having an outlet in fluid communication with an inlet of the engine core, the compressor including at least one compressor rotor in driving engagement with at least one of the turbine shaft and the engine shaft; a casing connected to the turbine section, the compressor and the engine core; and a mount cage for mounting the compound engine assembly to an aircraft, the mount cage including a plurality of struts connected to mounts attached to the casing outside of a hot zone including the turbine section, the at least one exhaust pipe and a part of the engine core adjacent the at least one exhaust pipe, the struts being separated from the hot zone by at least one firewall.

In another aspect, there is provided a compound engine assembly comprising: an engine core including at least one internal combustion engine in driving engagement with an engine shaft; a gearbox module including a gearbox module casing containing at least one gear train; a turbine section outside of the gearbox module casing, the turbine section having an inlet in fluid communication with an outlet of the engine core through at least one exhaust pipe, the turbine section including at least one turbine rotor connected to a turbine shaft, the turbine shaft in driving engagement with the engine shaft through one of the at least one gear train of the gearbox module; a compressor outside of the gearbox module casing, the compressor having an outlet in fluid communication with an inlet of the engine core, the compressor including at least one compressor rotor in driving engagement with at least one of the turbine shaft and the engine shaft; wherein the turbine section and the engine core are located on a same side of the gearbox module casing and the compressor is located on the opposite side of the gearbox module casing; and a mount cage for mounting the compound engine assembly to an aircraft and connected to the casing, the mount cage completely separated from the turbine section and the at least one exhaust pipe by at least one firewall.

DESCRIPTION OF THE DRAWINGS

Reference is now made to the accompanying figures in which:

FIG. 8 is a schematic tridimensional view of the compound engine assembly of FIG. 7 in accordance with a particular embodiment;

FIG. 9 is a schematic cross-sectional side view of the compound engine assembly of FIG. 8, with an inlet duct and firewall according to a particular embodiment;

FIG. 10A is a schematic tridimensional view of the compound engine assembly of FIG. 8, with an engine mount in accordance with a particular embodiment;

FIG. 10B is a schematic side view of the compound engine assembly and engine mount of FIG. 10A;

DETAILED DESCRIPTION

Figure 1:
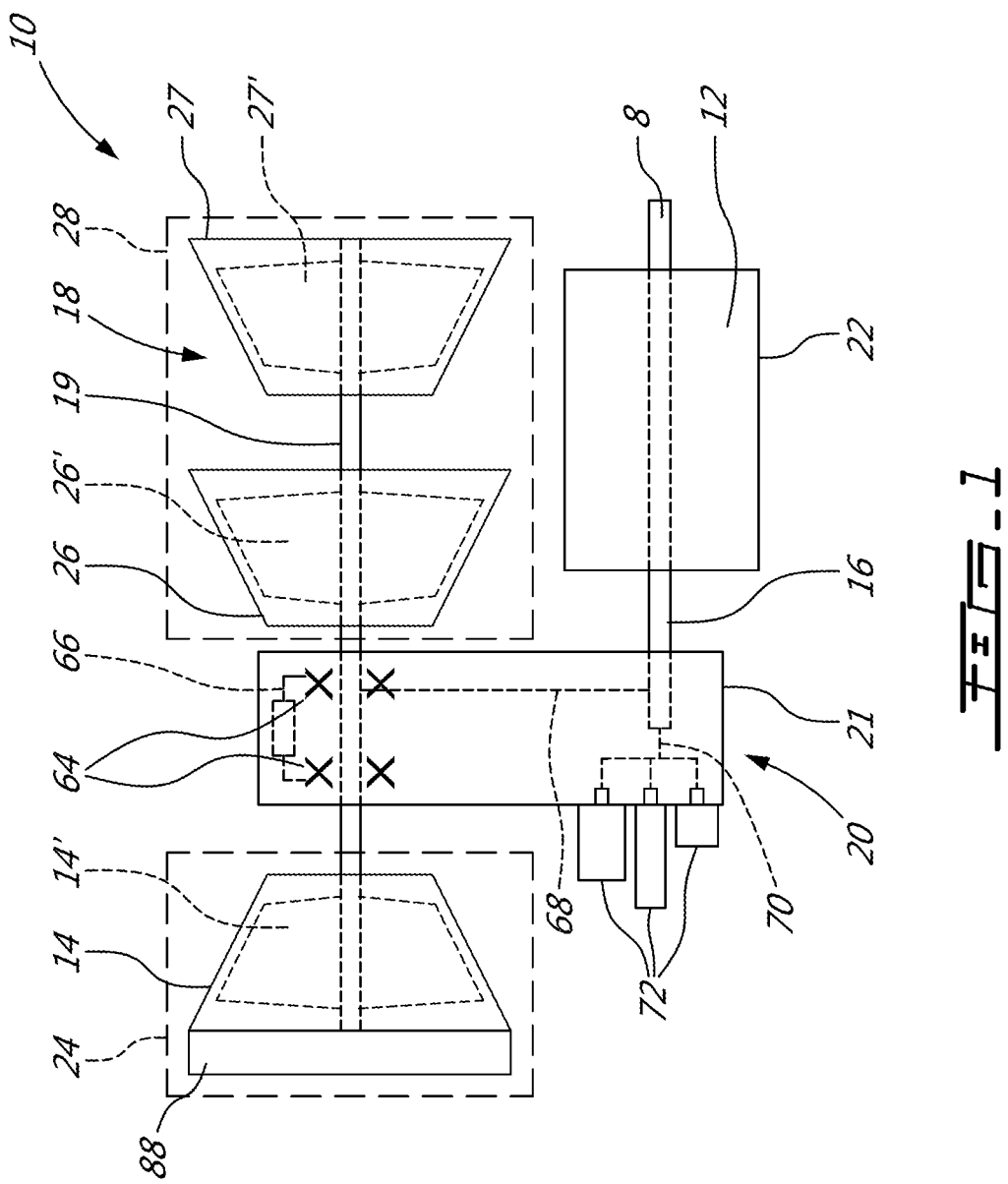
FIG. 1 is a schematic view of a compound engine assembly in accordance with a particular embodiment.

Referring to FIG. 1, a compound engine assembly 10 is generally shown, including a liquid cooled heavy fueled multi-rotor rotary engine core 12. The engine core 12 has an engine shaft 16 driven by the engine core 12 and driving a rotatable load, which is shown here as a drive shaft 8. The drive shaft 8 may be an integral part of the engine shaft 16, be directly connected thereto, or be connected thereto through a gearbox (not shown). It is understood that the compound engine assembly 10 may alternately be configured to drive any other appropriate type of load, including, but not limited to, one or more generator(s), propeller(s), accessory(ies), rotor mast(s), compressor(s), or any other appropriate type of load or combination thereof.

The compound engine assembly 10 is configured as a single shaft engine. The term "single shaft" is intended herein to describe a compound engine where all the rotating components (compressor rotor(s), turbine rotor(s), engine shaft, accessories) are mechanically linked together, either directly or through one more gearbox(es). Accordingly, a "single shaft" engine may include two or more mechanically linked shafts. The term "single shaft" is intended to be in contrast to an engine having two or more spools which are free to rotate with respect to one another such as to include one or more free turbine(s).

The compound engine assembly 10 includes a compressor 14 feeding compressed air to the inlet of the engine core 12 (corresponding to or communicating with the inlet port of each engine of the engine core 12). The engine core 12 receives the pressurized air from the compressor 14 and burns fuel at high pressure to provide energy. Mechanical power produced by the engine core 12 drives the engine shaft 16. Each engine of the engine core 12 provides an exhaust flow in the form of exhaust pulses of high pressure hot gas exiting at high peak velocity. The outlet of the engine core 12 (corresponding to or communicating with the exhaust port of each engine of the engine core 12) is in fluid communication with an inlet of a turbine section 18, and accordingly the exhaust flow from the engine core 12 is supplied to the turbine section 18. The turbine section 18 drives the compressor 14 and compounds power with the engine shaft 16.

In a particular embodiment, the compound engine assembly includes four (4) major modules: a core module 22 including the engine core 12, a gearbox module 20, a cold section or compressor module 24 including the compressor 14 and a hot section or turbine module 28 including the turbine section 18. In a particular embodiment, the turbine module 28 and compressor module 24 are removable by typical maintenance personnel, in the field, with the compound engine assembly 10 remaining attached to the aircraft, for ease of maintenance, repair and/or replacement. In a particular embodiment, each of the turbine module 28, compressor module 24 and core module 22 can be detached and removed from the compound engine assembly 10 in an individual and separate manner, i.e. without the need to detach/remove any of the other modules; in a particular embodiment, the components of each module are thus contained in and/or mounted to a casing which defines an enclosure independently of that of the other modules. In a particular embodiment, the modularity of the compound engine assembly 10 may allow reducing or minimizing the number of parts in the compound engine assembly 10 and/or may enable each module to run at speeds corresponding to optimum performance conditions.

Figure 3:
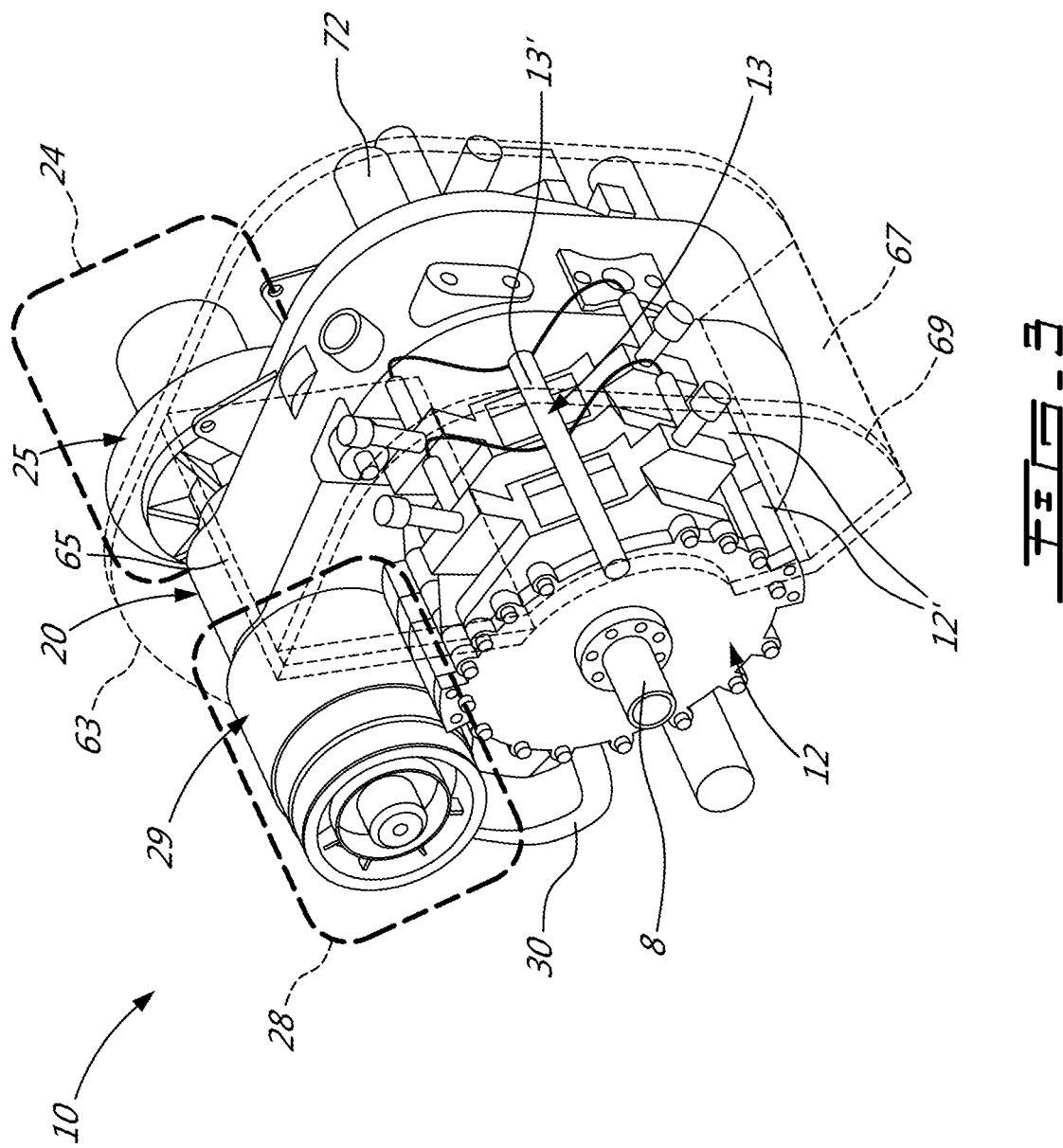
FIG. 3 is a schematic tridimensional view of the compound engine assembly of FIG. 1 in accordance with a particular embodiment.

Referring to FIG. 3, the core module 22 includes the engine core 12 and a fuel distribution system 13. In the embodiment shown, the engine core 12 includes a plurality of rotary engines 12' drivingly engaged to the shaft 16, and the fuel distribution system 13 includes a common rail 13' feeding a pilot and a main injector for each rotary engine. Although the engine core 12 is depicted as including two rotary engines 12', it is understood that in another embodiment, the engine core 12 may include more than two rotary engines 12' (e.g. 3 or 4 rotary engines), or a single rotary engine 12'. Each rotary engine 12' has a rotor sealingly engaged in a respective housing, with each rotary engine 12' having a near constant volume combustion phase for high cycle efficiency. In the embodiment shown, each rotary engine 12' is a Wankel engine.

Figure 2:
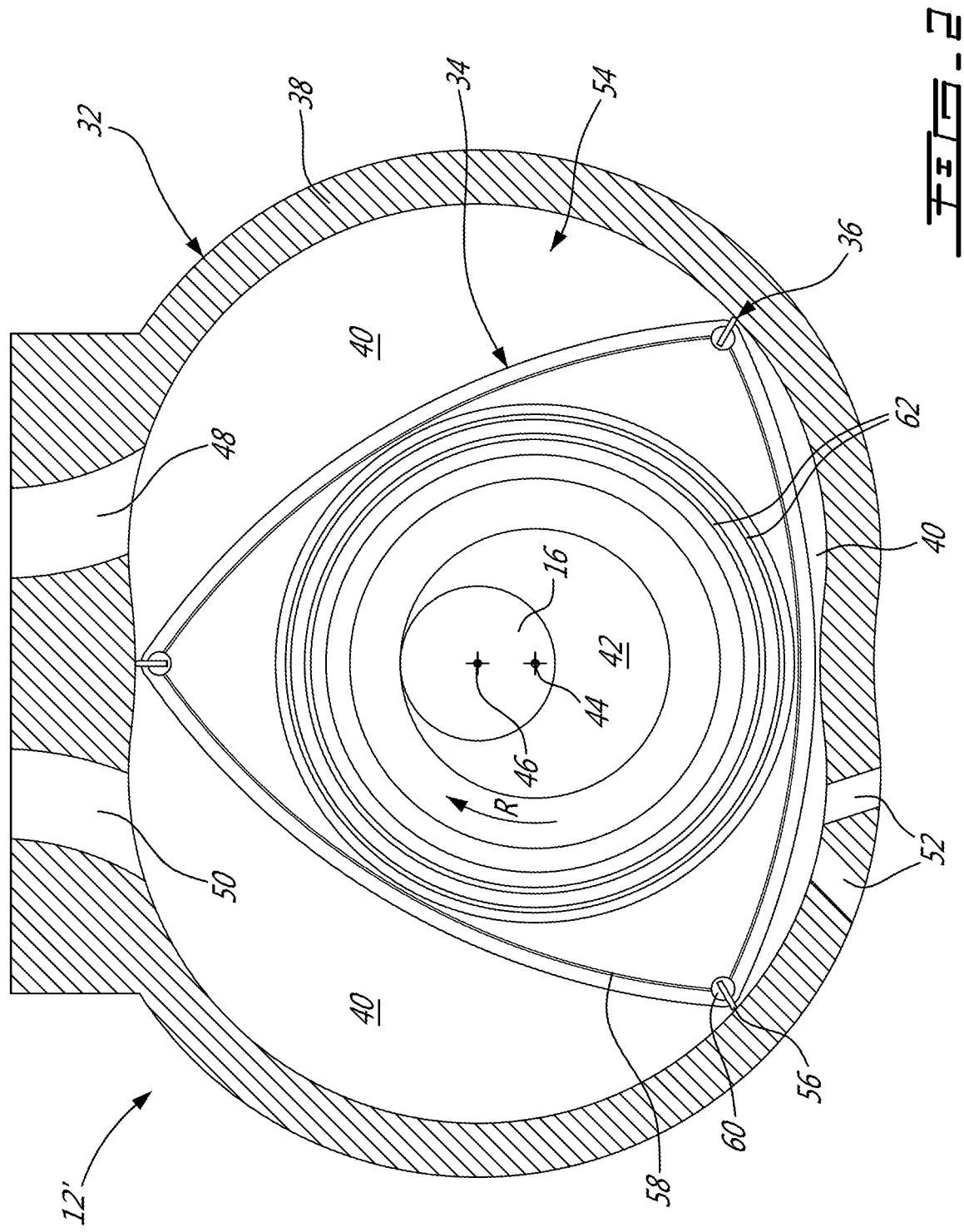
FIG. 2 is a cross-sectional view of a Wankel engine which can be used in a compound engine assembly such as shown in FIG. 1, in accordance with a particular embodiment.

Referring to FIG. 2, an exemplary embodiment of a Wankel engine which may be used as rotary engine 12' in the engine core 12 is shown. Each Wankel engine 12' comprises a housing 32 defining an internal cavity with a profile defining two lobes, which is preferably an epitrochoid. A rotor 34 is received within the internal cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the shaft 16 to perform orbital revolutions within the internal cavity. The shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the internal cavity to undergo the four phases of intake, compression, expansion and exhaust.

An intake port 48 is provided through the peripheral wall 38 for successively admitting compressed air into each working chamber 40. An exhaust port 50 is also provided through the peripheral wall 38 for successively discharging the exhaust gases from each working chamber 40. Passages 52 for a glow plug, spark plug or other ignition element, as well the fuel injectors are also provided through the peripheral wall 38. Alternately, the intake port 48, the exhaust port 50 and/or the passages 52 may be provided through an end or side wall 54 of the housing; and/or, the ignition element and a pilot fuel injector may communicate with a pilot subchamber (not shown) defined in the housing 32 and communicating with the internal cavity for providing a pilot injection. The pilot subchamber may be for example defined in an insert (not shown) received in the peripheral wall 38.

In the embodiment of FIG. 3, the fuel injectors are common rail fuel injectors, and communicate with a source of Heavy fuel (e.g. diesel, kerosene (jet fuel), equivalent biofuel), and deliver the heavy fuel into the engine(s) such that the combustion chamber is stratified with a rich fuel-air mixture near the ignition source and a leaner mixture elsewhere.

Referring back to FIG. 2, for efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360 degrees of rotation of the shaft, with the exhaust port remaining open for about 270 degrees of that rotation, thus providing for a pulse duty cycle of about 75%. By contrast, a piston of a reciprocating 4-stroke piston engine typically has one explosion per 720 degrees of rotation of the shaft with the exhaust port remaining open for about 180 degrees of that rotation, thus providing a pulse duty cycle of 25%.

In a particular embodiment which may be particularly but not exclusively suitable for low altitude, each Wankel engine has a volumetric expansion ratio of from 5 to 9, and operates following the Miller cycle, with a volumetric compression ratio lower than the volumetric expansion ratio, for example by having the intake port located closer to the top dead center (TDC) than an engine where the volumetric compression and expansion ratios are equal or similar. Alternately, each Wankel engine may operate with similar or equal volumetric compression and expansion ratios.

It is understood that other configurations are possible for the engine core 12. The configuration of the engine(s) 12' of the engine core 12, e.g. placement of ports, number and placement of seals, number of fuel injectors, etc., may vary from that of the embodiment shown. In addition, it is understood that each engine 12' of the engine core 12 may be any other type of internal combustion engine including, but not limited to, any other type of rotary engine, and any other type of non-rotary internal combustion engine such as a reciprocating engine.

Referring back to FIG. 1, in a particular embodiment the compressor 14 is a centrifugal compressor with a single impeller 14'. Other configurations are alternately possible. The compressor 14 may be single-stage device or a multiple-stage device and may include one or more rotors having a circumferential array of radial, axial or mixed flow blades.

Figure 4:
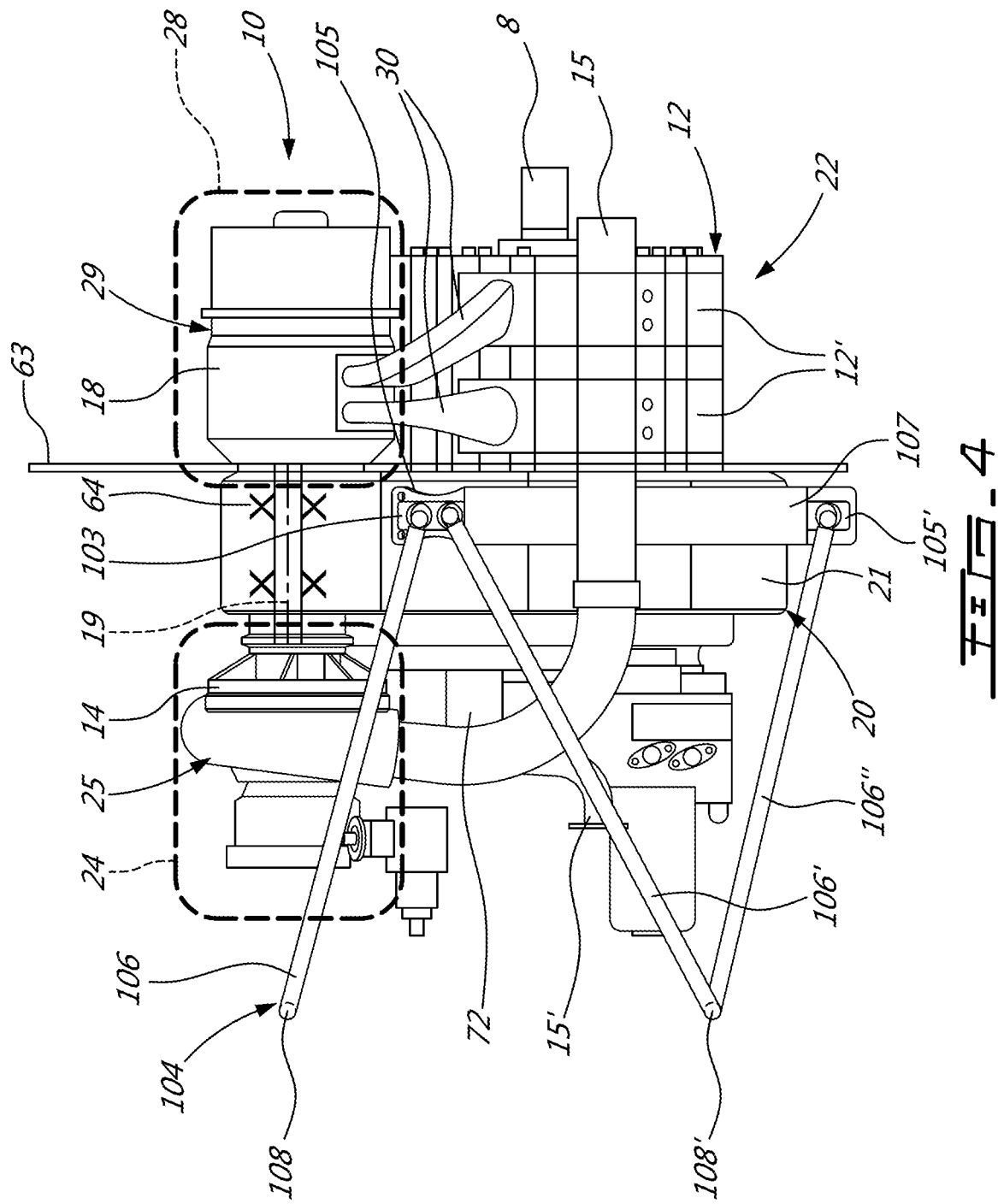
FIG. 4 is a schematic side view of the compound engine assembly of FIG. 3, with an engine mount in accordance with a particular embodiment.

Referring to FIG. 3, the gearbox module 20 includes a casing 21 containing (e.g. enclosing) at least one gear train, and the compressor module 24 includes a casing 25 located outside of the gearbox module casing 21. The compressor module casing 25 contains (e.g. encloses) the compressor rotor(s) 14' (e.g. impeller), diffuser, shroud, inlet scroll, and variable inlet guide vanes 88 (see FIG. 1) through which the air circulates before reaching the compressor rotor(s). The compressor module casing 25 may include a plurality of casing pieces cooperating to define an enclosure containing the compressor 14, and/or may be defined in whole or in part by outer walls of the compressor 14. Referring to FIGS. 3-4, the compressor module casing 25 is mounted on a face of the gearbox module casing 21. In a particular embodiment, the compressor module casing 25 and the gearbox module casing 21 are detachably interconnected, for example by having abutting flanges of the casings 25, 21 interconnected by bolts and/or clamps or through the use of any other appropriate type of fasteners, including, but not limited to, such engagement members or fasteners defining a type of connection known as "quick access disconnect". Other configurations are also possible.

Referring to FIG. 4, in a particular embodiment the communication between the outlet of the compressor 14 and the inlet of the engine core 12 is performed through an intake manifold 15. In a particular embodiment, the compressor rotor(s) are sized to supply engine mass flow and cabin air bleed. The intake manifold 15, which may be provided separately from the compressor module 24, includes a branch-off port 15' for pressurized cabin bleed air.

The turbine module 28 includes a turbine module casing 29 containing (e.g. enclosing) the turbine section 18, including at least one rotor connected to a turbine shaft 19, with respective turbine vane(s), housing(s), containment feature(s) and tie-bolt(s). The turbine module casing 29 is spaced from the compressor module casing 25 and also located outside of the gearbox module casing 21. The turbine module casing 29 may include a plurality of casing pieces cooperating to define an enclosure containing the turbine section 18 and/or may be defined in whole or in part by outer walls of the turbine section 18. The turbine module casing 29 is mounted on the face of the gearbox module casing 21 opposite that receiving the compressor module casing 25; in a particular embodiment, the turbine module casing 29 is mounted on the forward face of the gearbox module casing 21. In a particular embodiment, the turbine module casing 29 and the gearbox module casing 21 are detachably interconnected, for example by having abutting flanges of the casings 29, 21 interconnected by bolts and/or clamps or through the use of any other appropriate type of fasteners, including, but not limited to, such engagement members or fasteners defining a type of connection known as "quick access disconnect". Other configurations are also possible.

A plurality of exhaust pipes 30 provide the fluid communication between the outlet of the engine core 12 (exhaust port of each engine 12') and the inlet of the turbine section 18. The core module 22 is mounted on the same face of the gearbox module casing 21 as the turbine module 28; in a particular embodiment, close-coupling of the turbine module 28 to the core module 22 helps increase (and preferably maximize) exhaust gas energy recovery by keeping the exhaust pipes 30 between the engine core 12 and the turbine section 18 as short as possible and controlling the flow area throughout. The exhaust pipes 30 become very hot during use, and accordingly appropriate materials selection and cooling is implemented to ensure their durability.

As can be seen in FIG. 1, the turbine section 18 may include one or more turbine stages contained in the turbine module casing. In a particular embodiment, the turbine section 18 includes a first stage turbine 26 receiving the exhaust from the engine core 12, and a second stage turbine 27 receiving the exhaust from the first stage turbine 26. The first stage turbine 26 is configured as a velocity turbine, also known as an impulse turbine, and recovers the kinetic energy of the core exhaust gas while creating minimal or no back pressure to the exhaust of the engine core 12. The second stage turbine 27 is configured as a pressure turbine, also known as a reaction turbine, and completes the recovery of available mechanical energy from the exhaust gas. Each turbine 26, 27 may be a centrifugal or axial device with one or more rotors having a circumferential array of radial, axial or mixed flow blades. In another embodiment, the turbine section 18 may include a single turbine, configured either as an impulse turbine or as a pressure turbine.

A pure impulse turbine works by changing the direction of the flow without accelerating the flow inside the rotor; the fluid is deflected without a significant pressure drop across the rotor blades. The blades of the pure impulse turbine are designed such that in a transverse plane perpendicular to the direction of flow, the area defined between the blades is the same at the leading edges of the blades and at the trailing edges of the blade: the flow area of the turbine is constant, and the blades are usually symmetrical about the plane of the rotating disc. The work of the pure impulse turbine is due only to the change of direction in the flow through the turbine blades. Typical pure impulse turbines include steam and hydraulic turbines.

In contrast, a reaction turbine accelerates the flow inside the rotor but needs a static pressure drop across the rotor to enable this flow acceleration. The blades of the reaction turbine are designed such that in a transverse plane perpendicular to the direction of flow, the area defined between the blades is larger at the leading edges of the blades than at the trailing edges of the blade: the flow area of the turbine reduces along the direction of flow, and the blades are usually not symmetrical about the plane of the rotating disc. At least part of the work of the pure reaction turbine is due to the acceleration of the flow through the turbine blades.

Most aeronautical turbines are not "pure impulse" or "pure reaction", but rather operate following a mix of these two opposite but complementary principles—i.e. there is a pressure drop across the blades, there is some reduction of flow area of the turbine blades along the direction of flow, and the speed of rotation of the turbine is due to both the acceleration and the change of direction of the flow. The degree of reaction of a turbine can be determined using the temperature-based reaction ratio (equation 1) or the pressure-based reaction ratio (equation 2), which are typically close to one another in value for a same turbine:

$$\text{Reaction } (T) = \frac{(t_{s3} - t_{s5})}{(t_{s0} - t_{s5})} \quad (1)$$

$$\text{Reaction } (P) = \frac{(P_{s3} - P_{s5})}{(P_{s0} - P_{s5})} \quad (2)$$

where T is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

In a particular embodiment, the first stage turbine 26 is configured to take benefit of the kinetic energy of the pulsating flow exiting the engine core 12 while stabilizing the flow and the second stage turbine 27 is configured to extract energy from the remaining pressure in the flow while expanding the flow. Accordingly, the first stage turbine 26 has a smaller reaction ratio than that of the second stage turbine 27.

In a particular embodiment, the second stage turbine 27 has a reaction ratio higher than 0.25; in another particular embodiment, the second stage turbine 27 has a reaction ratio higher than 0.3; in another particular embodiment, the second stage turbine 27 has a reaction ratio of about 0.5; in another particular embodiment, the second stage turbine 27 has a reaction ratio higher than 0.5.

In a particular embodiment, the first stage turbine 26 has a reaction ratio of at most 0.2; in another particular embodiment, the first stage turbine 26 has a reaction ratio of at most 0.15; in another particular embodiment, the first stage turbine 26 has a reaction ratio of at most 0.1; in another particular embodiment, the first stage turbine 26 has a reaction ratio of at most 0.05.

It is understood that any appropriate reaction ratio for the second stage turbine 27 (included, but not limited to, any of the above-mentioned reaction ratios) can be combined with any appropriate reaction ratio for the first stage turbine 26 (included, but not limited to, any of the above-mentioned reaction ratios), and that these values can correspond to pressure-based or temperature-based ratios. Other values are also possible. For example, in a particular embodiment, the two turbines 26, 27 may have a same or similar reaction ratio; in another embodiment, the first stage turbine 26 has a higher reaction ratio than that of the second stage turbine 27. Both turbines 26, 27 may be configured as impulse turbines, or both turbines 26, 27 may be configured as pressure turbines.

Still referring to FIG. 1, in the embodiment shown, the compressor rotor(s) 14', first stage turbine rotor(s) 26' and second stage turbine rotor(s) 27' are connected to (e.g. rigidly connected to, integrally formed with, attached to, or any other type of connection allowing the rotors to rotate together with the shaft at a same speed) the turbine shaft 19, which extends through the gearbox module 20, parallel and radially offset from (i.e. not co-axial with) the engine shaft 16.

As can be seen in FIGS. 1 and 4, the compressor rotor(s) 14' and turbine rotor(s) 26', 27' are cantilevered, i.e. the turbine shaft 19 is rotationally supported on only one side of the compressor rotor(s) 14', and on only one side of the turbine rotors 26', 27'. The turbine shaft 19 is rotationally supported by a plurality of bearings 64 (e.g. rolling element bearings such as oil lubricated roller bearings and oil lubricated ball bearings, journal bearings) all located on a same side of the compressor rotor(s) 14', on a same side of the first stage turbine rotor(s) 26', and on a same side of the second stage turbine rotor(s) 27'. In the embodiment shown, the bearings 64 are located between the compressor rotor(s) 14' and the turbine rotors 26', 27' and contained within the gearbox module casing 21, without additional bearings being provided outside of the gearbox module 20. The rotating assembly of the compressor module 24 and of the turbine module 28 is dynamically designed to rotate in a cantilevered manner, with the critical modes of deflection outside of the engine's operating conditions. Accordingly, the compressor module 24 and turbine module 28 do not include bearings, and are thus not part of the bearing lubricant circulation system 66, which is contained within the gearbox module casing 21. This eliminates the need to provide external lubricant (e.g. oil) feed or scavenge lines on the compressor module 24 and on the turbine module 28, which may facilitate removal of the compressor module 24 and of the turbine module 28 from the remainder of the compound engine assembly 10.

Alternately, the compressor 14 and turbine section 18 can each have their own dedicated shaft, for example for optimum component performance. In this case, the compressor shaft may also be only supported by bearings all located on a same side of the compressor rotor(s) 14', for example in the gearbox module casing 21, such that the compressor rotor(s) 14' are supported in a cantilevered manner. The compressor rotor(s) 14' is in driving engagement with the turbine shaft 19 and/or the engine shaft 16, for example by having the compressor shaft mechanically linked with the turbine shaft 19 and/or the engine shaft 16 through a gear train of the gearbox module 20.

Still referring to FIG. 1, the gearbox module 20 is a combining gearbox module 20, including both a compounding gear train 68 and one or more accessory gear train(s) 70 contained in the gearbox module casing 21. The turbine shaft 19 is mechanically linked to, and in driving engagement with, the engine shaft 16 through the compounding gear train 68, such that the mechanical energy recovered by the turbine section 18 is compounded with that of the engine shaft 16. In a particular embodiment, the compounding gear train 68 includes offset gears. In a particular embodiment, the elements of the compounding gear train 68 are configured to define a reduction ratio allowing each module to operate at its optimum operating speed. The reduction ratio may accordingly depend on engine sizing and/or other factors. In a particular embodiment, the reduction ratio is approximately 5:1; other values are also possible.

In a particular embodiment, having the compressor and turbine rotors 14', 26', 27' on a same shaft 19 allows for the compounding gear train 68 to be lighter, as the compounding gear train is sized to transmit only the portion of the turbine power remaining after driving the compressor 14.

It is understood that other types of gear trains are also possible, particularly, although not exclusively, for other configurations of the relative position between the modules. For example, in an alternate embodiment, the turbine section 18 and/or compressor section 14 may be positioned such that its rotating components rotate coaxially with the engine shaft 16, and a planetary gear system may provide the mechanical link and driving engagement between the engine shaft 16 and the shaft of the turbine section 18 and/or compressor section 14. Other configurations are also possible.

The accessory gear train(s) 70 connect (mechanically link) one or more accessories 72 with the engine shaft 16 and/or the turbine shaft 19. The accessories 72 are mounted on the same face of the gearbox module casing 21 as the compressor module 24 and may include, but are not limited to, one or any combination of the following: starter, fuel pump, oil pump, coolant pump, aircraft hydraulic pump, aircraft air conditioning compressor, generator, alternator, permanent magnet alternator. In a particular embodiment, the accessory gear train 70 includes an offset gear system. Other configurations are also possible, including, but not limited to, the combination of offset and planetary gear systems.

Referring to FIGS. 3-4, the proximity of the turbine module 28 to the core module 22, and the gearbox module 20 located between the hot side (turbine module 28 and core module 22) and the cold side (compressor module 24 and accessories 72) enables the delimitation of a relatively small fire zone, which in a particular embodiment simplifies the design of the aircraft nacelle and of the fire suppression system, improving fire safety for the remainder of the compound engine assembly. In the embodiment shown, the compound engine assembly 10 includes a circumferential firewall 63 extending circumferentially around the gearbox module casing 21 and radially outwardly therefrom. The firewall 63 is located such that the hot zone or fire zone is located on one side thereof, and the accessories 72 and compressor module 24 are located on the other side thereof. In a particular embodiment, the hot zone includes the turbine module 28, the exhaust pipes 30, and the surface of the core module 22 adjacent the exhaust pipes 30, for example along a 75 degree quadrant containing the exhaust pipes 30. In the embodiment shown, the turbine module 28 and core module 22 are located on one side of the firewall 63, and the accessories 72 and compressor module 24 are located on the other side—i.e. the axial location of the firewall 63 is between that of the turbine module 28 and core module 22, and that of the accessories 72 and compressor module 24.

Additional firewalls are provided to isolate the fuel system 13 from the hot zone, including the hot turbine module 28 and the turbine exhaust pipes 30. In the embodiment of FIG. 3, two axial firewalls 65, 67 extend from the circumferential firewall 63; the axial firewalls 65, 67 extend axially along the core module 22, and radially outwardly therefrom. These two axial firewalls 65, 67 are circumferentially spaced from one another such that the fuel system 13 is located therebetween; one of the firewalls 65 may be located at or about top dead center position of the rotary engines 12'. In the embodiment shown, the axial firewalls 65, 67 are respectively located at or about the 12 o'clock position (top dead center) and the 4 o'clock position. An additional circumferential firewall 69 is axially spaced from the first circumferential firewall 63 and extends between the axial firewalls 65, 67, circumferentially around part of the core module 22, and radially outwardly from the core module 22. The fuel system 13 is thus enclosed in a perimeter defined by the firewalls 63, 65, 67, 69, which separate it from the turbine module 28, accessories 72 and compressor module 24.

In a particular embodiment, the firewalls 63, 65, 67, 69 extend radially outwardly to the position of the nacelle contour, such that the nacelle cooperates with the perimeter defined by the firewalls 63, 65, 67, 69 to enclose the fuel system 13 separately from the accessories 72, compressor module 24 and turbine module 28, and cooperates with the first circumferential firewall 63 to enclose the turbine module 28 and core module 22 separately from the accessories 72 and compressor module 24. In another embodiment, additional firewalls positioned radially inwardly of the nacelle contour may be provided to cooperate with the firewalls 63, 65, 67, 69 to form the enclosure containing the fuel system 13 and the enclosure containing the turbine module 28 and core module 22 independently of the nacelle, in order to provide for smaller enclosures than the enclosures that would be defined by the nacelle.

In a particular embodiment, no electrical elements or accessories are included in the turbine module 28, which reduces or eliminates the risk of fire in the turbine module 28 in case of fuel leak. Sensors and electrical elements other than those associated with the core module 22 are all located on the cold side of the gearbox module 20 where the temperature is not high enough to light a fire, and are separated from the hot zone by the firewall 63; the fuel system 13 is further separated from the remainder of the hot zone, including the turbine module 28 and exhaust pipes 30, by the firewalls 65, 67, 69, to further minimize the risk of fire.

It is understood that in FIG. 3, the firewalls 63, 65, 67, 69 have been schematically illustrated as transparent for clarity purposes, to avoid obstructing view of the other components of the engine 10, but that such illustration does not imply a need for the firewalls 63, 65, 67, 69 to be made of transparent material. The firewalls 63, 65, 67, 69 are made of any material which is sufficiently resistant to high temperature as per current certification requirements. In a particular embodiment, the firewalls 63, 65, 67, 69 are made of a material able to resist a temperature of 2000 degrees F. for 5 minutes. An example of suitable material is steel, but suitable other materials may be used.

Figure 5:
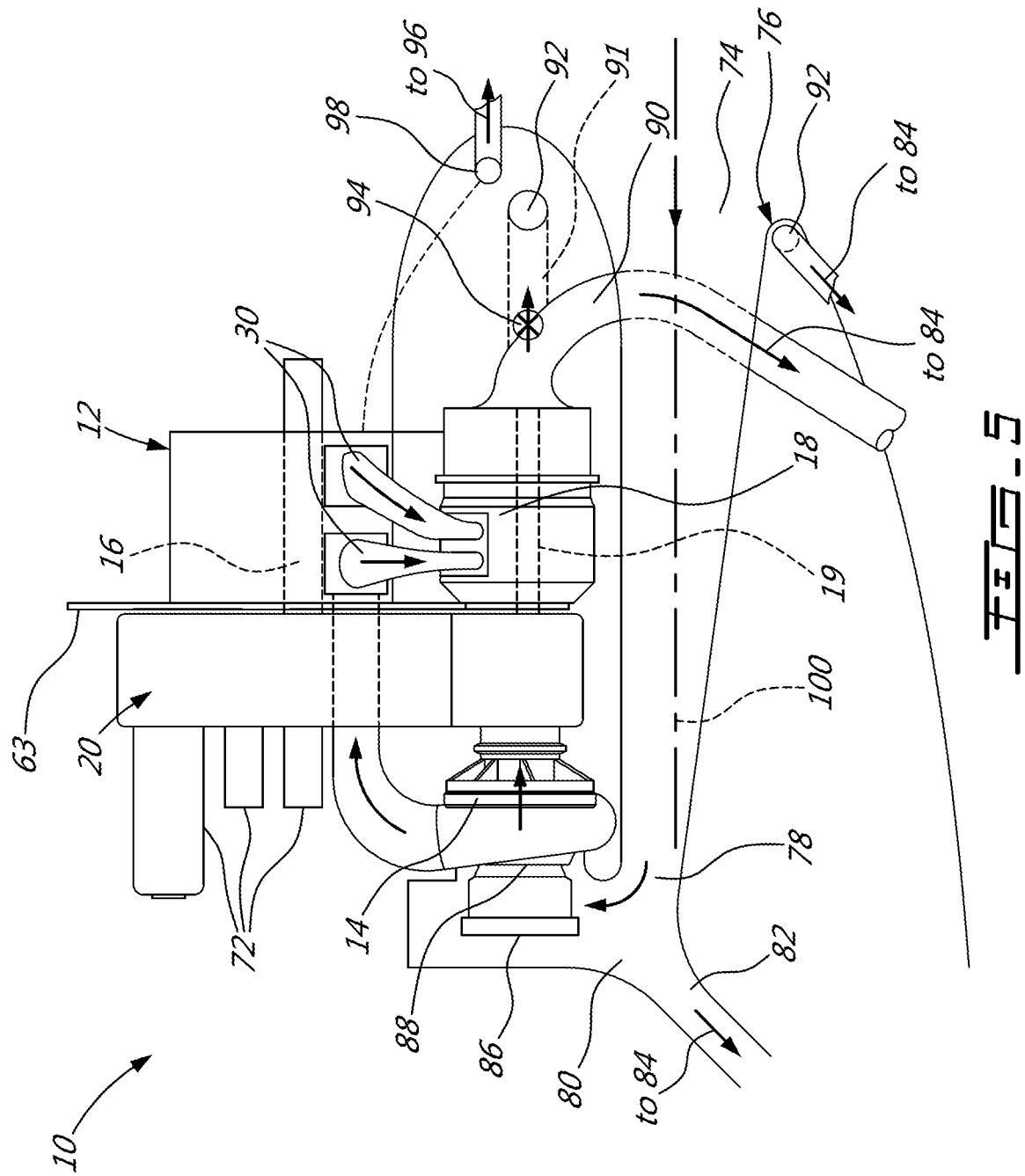
FIG. 5 is a schematic cross-sectional side view of the compound engine assembly of FIG. 3, with an inlet duct and firewall according to a particular embodiment.

Referring to FIG. 5, the compound engine assembly 10 is a reversed flow assembly. The compound engine assembly 10 includes an inlet duct 74 having an inlet 76 communicating with ambient air outside of or around the assembly 10, for example ambient air outside of a nacelle receiving the assembly. The inlet duct 74 includes an inertial particle separator 78 at its downstream end. Immediately downstream of the inertial particle separator 78, the inlet duct communicates with a first conduit 80 communicating with the compressor 14 and a second conduit 82 defining an inlet bypass duct communicating with ambient air outside of or around the assembly 10, for example through communication with the exhaust duct 84 (see FIG. 6) of the compound engine assembly 10. The first conduit 80 defines a sharp turn with respect to the inlet duct 74 (e.g. by extending approximately perpendicular thereto), extending at a sufficient angle from the inlet duct 74 such that the heavier particles (e.g. ice, sand) continue to the downwardly angled second conduit 82 while the air follows the sharp turn of the first conduit 80. The section of the inlet duct 74 defining the inertial particle separator 78 and the first and second conduits 80, 82 are sized to achieve adequate air velocities to ensure separation of the particles.

Still referring to FIG. 5, during engine operation, the ambient air penetrates the compound engine assembly 10 through the inlet 76 of the inlet duct 74 on one end of the assembly 10, and circulates through the inlet duct 74 in a first direction across a length of the assembly 10. The air reaches the compressor 14 after having passed through the inertial particle separator 78, turned into the conduit 80, and circulated through a filter 86. Inlet guide vanes 88 modulate the flow into the compressor 14. The air is pressure boosted by the compressor 14 and routed to the engine core 12; although not shown, the air flow between the compressor 14 and engine core 12 may circulate in part or in whole through an intercooler. The engine core 12 further compresses the air.

Fuel is injected in the engine core 12 and combusted, and work is extracted during the expansion cycle of the engine core 12. Exhaust from the engine core 12 is circulated to the turbine section 18. Work is further extracted by the turbines (e.g. impulse turbine, then pressure turbine) to drive the compressor 14, and the remaining useful work is transmitted to the engine shaft 16 via the gearbox module 20. The air/gases circulation from the compressor 14 to the turbine section 18 is done along a direction generally opposite of that of the air circulation within the inlet duct 74, such that the exhaust gases exit the turbine section 18 near the same end of the assembly 10 as the inlet 76 of the inlet duct 74.

In the embodiment shown, a fraction of the turbine exhaust flow is used for anti-icing/de-icing of the inlet 76 of the assembly 10. The turbine exhaust communicates with a first exhaust conduit 90 communicating with the exhaust duct 84 and with a second exhaust conduit 91 communicating with one or more conduits 92 located in the lip of the inlet 76, which then also communicate with the ambient air outside of or around the assembly 10, for example directly, through communication with the exhaust duct 84, or through communication with the second conduit (inlet bypass duct) 82. A valve 94 can be provided at the entry of the second exhaust conduit 91 to regulate the flow of exhaust air being circulated in the lip conduit(s) 92 and/or to close the flow when de-icing is not necessary.

In addition or in the alternative, anti-icing could be achieved with hot coolant from a heat exchanger (cooler) 96 (see FIG. 6) of the assembly 10, for example by having part of a hot coolant flow exiting the engine core 12 circulating through a coil tube 98 disposed in the lip of the inlet 76 before being circulated to the associated heat exchanger 96.

Still referring to FIG. 5, it can be seen that the turbine shaft 19 is parallel to and radially offset from (i.e., non-coaxial to) the engine shaft 16, and that both shafts 16, 19 are radially offset from (i.e., non-coaxial to) the inlet duct 74. In the embodiment shown, the shafts 16, 19 are radially offset from a longitudinal central axis 100 of at least part of the inlet duct 74, or of the whole inlet duct 74. The air flow within the inlet duct 74 occurs along a direction corresponding to or substantially corresponding to that of the central axis 100. It is understood that the central axis 100 may be a straight line (straight duct) or a curved line (curved duct e.g. single curve, S-shaped). In a particular embodiment, the central axis 100 is parallel to the shafts 16, 19. Other configurations are also possible, including, but not limited to, the central axis 100 extending at a non-zero angle with respect to the shafts 16, 19. In embodiments where the inlet duct 74 has a curved shape (e.g.), an imaginary line may be defined as the straight line more closely corresponding to the curved central axis of the inlet duct 74; this imaginary line may be parallel to the shafts 16, 19 or extend at a non-zero angle with respect thereto.

Figure 6:
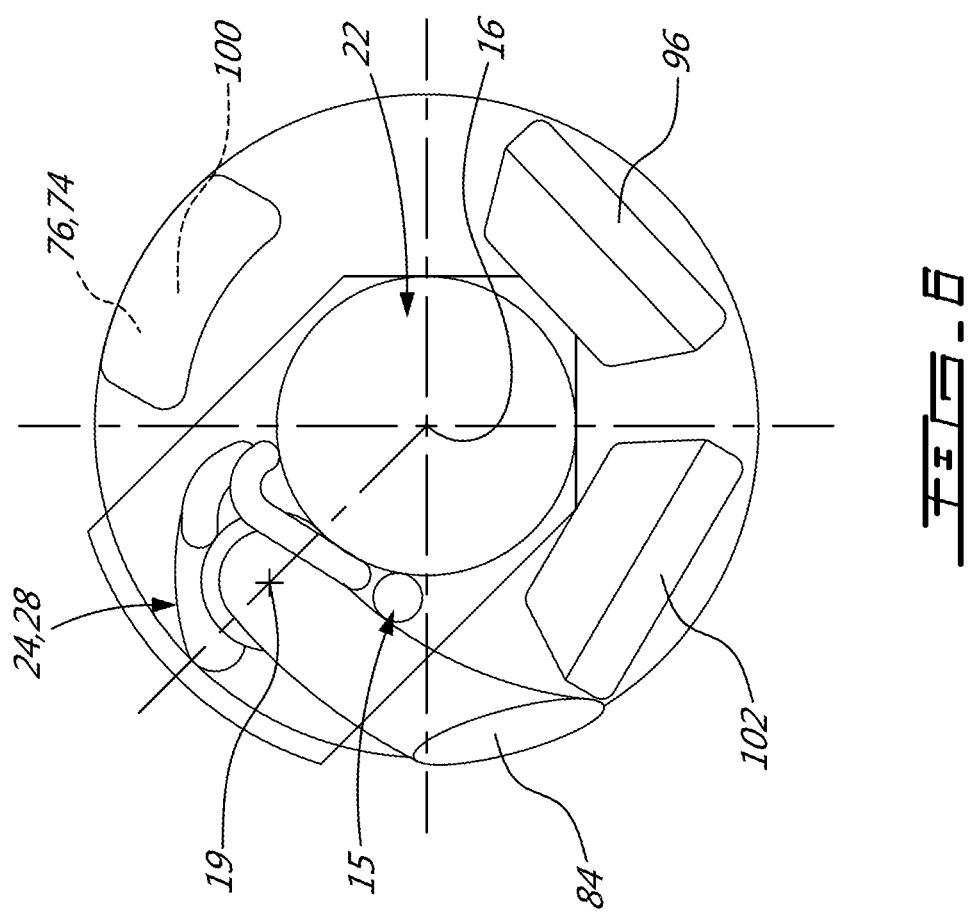
FIG. 6 is a schematic front view of the compound engine assembly of FIG. 3, according to a particular embodiment.

FIG. 6 shows an example of relative angular positions of the turbine shaft 19, the assembly inlet 76 and inlet duct 74, a lubricant (e.g. oil) heat exchanger 102 for cooling of the oil or other lubricant circulated through the compound engine assembly 10 (e.g. to lubricate the bearings of the shafts 16, 19 and the rotor(s) of the engine core 12), and the coolant (e.g. water) heat exchanger 96 for cooling the coolant circulated through the housing of the engine core 12. In a particular embodiment, the layout of the compound engine assembly 10 is suitable for a compact streamlined nacelle with minimum aircraft drag.

The radial offset of the turbine shaft 19 and of the inlet duct 74 with respect to the engine shaft 16 allows for the compressor and turbine modules 24, 28, inlet duct 74, and heat exchangers 96, 102 to be clockable around the engine shaft 16, i.e. to be disposed in a variety of angular positions around the engine shaft 16 to suit specific aircraft nacelle designs. For example, the configuration of FIG. 6 could be modified by placing the compressor and turbine modules 24, 28 closer to the nacelle exhaust, e.g. more toward the bottom of the assembly 10, to reduce or minimize the length of the exhaust duct 84 and/or exhaust conduits 90, 91 connected to the exhaust duct 84. The angular position of the assembly inlet 76 and inlet duct 74 around the engine shaft 16 can also be changed to suit specific aircraft nacelle designs. The coolant and lubricant heat exchangers 96, 102 can for example be located on the sides of the core module 22, at the top of the core module 22, or behind the core module 22 as suitable for the particular aircraft associated with the compound engine assembly 10 and/or to provide increased accessibility to the heat exchangers 96, 102 and other components for ease of maintenance, repair and/or replacement. The accessories 72 may be located all at a same angular position, and clocked around the core module 22 as required with respect to available space to receive the compound engine assembly 10. In a particular embodiment, locating all of the accessories 72 at a same angular position allows for all of the accessories 72 to be accessible through a single compartment access panel.

Referring back to FIG. 4, in a particular embodiment the compound engine assembly 10 is mounted to the aircraft through a mount cage 104 including struts 106 connected to two opposed side mounts 105 attached to the casing 21 of the gearbox module 20, and a bottom mount 105' also attached to the casing 21. In the embodiment shown, the mount cage 104 connects the engine assembly 10 to two upper aircraft mount points 108 and two lower aircraft mount points 108' (e.g. provided on a bulkhead of the aircraft). On each side, the mount cage 104 includes first and second struts 106 connected to the corresponding side mount 105, and a third strut 106" connected to the bottom mount 105'; the struts 106, 106' and 106" are connected to the mounts 105, 105' through an isolator 103, which may include for example a suitable elastomeric material. The first and second struts 106, 106' extending from the same side mount 105 are angled with respect to one another such as to extend further apart from each other as distance from the side mount 105 increases. The first strut 106 is configured to be connected to the corresponding upper aircraft mount point 108, while the second and third struts 106', 106" are configured to be connected to the corresponding lower aircraft mount point 108'. An arcuate support 107 extends under the engine 10 and is connected to the casing 21 of the gearbox module 20, and the mounts 105, 105' are attached to the casing 21 through connection with the arcuate support 107. The struts 106, 106', 106" are positioned such as to avoid crossing the exhaust pipes 30. In a particular embodiment, such a configuration avoids having any hot gas leak from the core engine exhaust pipes 30 into the turbine module 28 impinging onto the mount structure (including isolators 103, fasteners, etc.), and thus avoids compromises in mount structural integrity which could result from such leaks impinging onto the mount structure.

In the embodiment shown, the mount cage 104 and the mounts 105, 105' are located out of the fire zone (turbine module 28/core module 22). The mount cage 104, including the struts 106, 106', 106", as well as the mounts 105, 105' are located on the "cold side" of the gearbox module casing 21, and separated from the turbine module 28, core module 22 and exhaust pipes 30 by the firewall 63. The mount cage 104 is thus completely contained within an axial space extending axially from a first location at the cold end of the assembly to a second location on the gearbox module casing 21, with the turbine module 28, core module 22 and exhaust pipes 30 being located outside of this axial space. Accordingly, the struts 106, 106', 106" are not challenged by the hot temperature of the turbine module 28, exhaust pipes 30 and core module 22, which may help improve the structural integrity of the mount cage 104 and of its connection with the engine 10.

Figure 7:
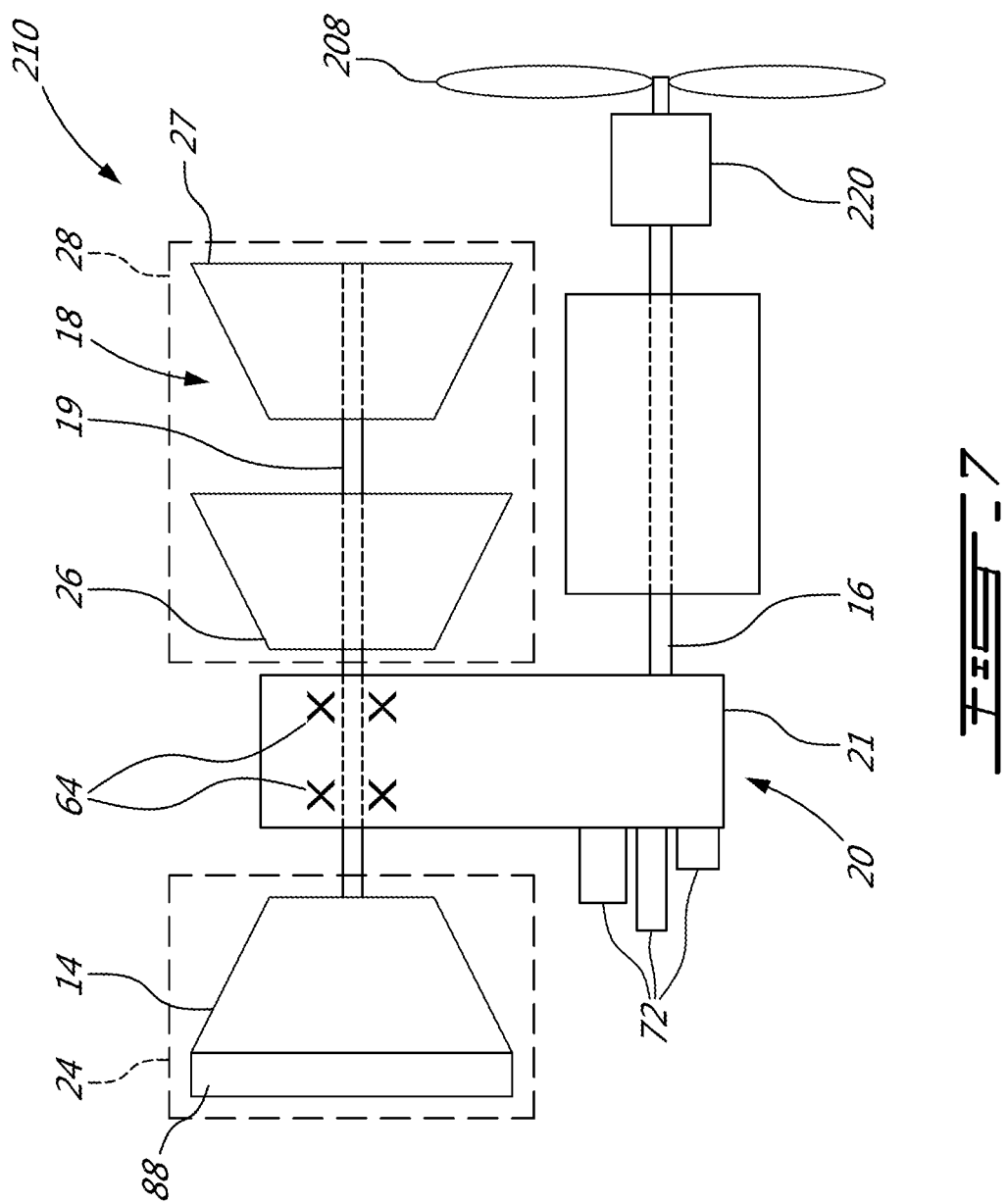
FIG. 7 is a schematic view of a compound engine assembly in accordance with another particular embodiment.

Referring to FIGS. 7-9 and 10A-10B, a compound engine assembly 210 according to an alternate embodiment is shown, where elements similar to or identical to the corresponding elements of the compound engine assembly 10 are identified by the same reference numerals and will not be further described herein. As shown in FIGS. 7-8, the compound engine assembly 210 is configured as a reversed flow single shaft engine and includes five (5) major modules: the core module 22, the gearbox module 20, the cold section/compressor module 24, the hot section/turbine module 28, and a reduction gearbox module 220. In the compound engine assembly 210, the rotatable load driven by the engine shaft 16 of the core module 22 is a propeller 208. The engine shaft 16 is engaged to the propeller 208 through the reduction gearbox module 220. The core module 12 is depicted as including three (3) rotary engines 12', but is it understood that any other adequate number of rotary engines or of other types of internal combustion engines may be used.

In the embodiment shown, the reduction gearbox module 220 comprises a planetary gearbox system; other configurations are also possible, including, but not limited to, offset gearbox and double-branch offset gear train. Although not shown, additional accessories may be mechanically linked to and drivingly engaged to the reduction gearbox module.

Referring to FIG. 9, in use, the ambient air penetrates the compound engine assembly 210 through the inlet 76 of the inlet duct 74, circulates through the inlet duct 74, through the inertial particle separator 78, changes direction to circulate across the filter 86, inlet guide vanes 88, compressor 14, optional intercooler 217 (see FIG. 10), and engine core 12. Exhaust from the engine core 12 is circulated to the turbine section 18 (which may include two turbine stages as previously described), where work is further extracted to drive the compressor. The remaining useful work is transmitted to the engine shaft 16 via the gearbox module 20. It can be seen that a fraction of the turbine exhaust flow can be circulated to the lip conduit 92 for anti-icing of the lip of the inlet 76, as described above.

The firewall 63 extends from the gearbox module casing 21 between the fire zone (turbine module 28/core module 22) and the accessories 72 and compressor module 24, as described above.

The compound engine assembly 210 also includes a turbine shaft 19 parallel to and radially offset from (i.e., non-coaxial to) the engine shaft 16, with both shafts being radially offset from (i.e., non-coaxial to) the central axis 100 extending along the length of part of or of the whole of the inlet duct 74. The central axis 100 may be parallel to the shafts 16, 19, may be a straight line extending at a non-zero angle with respect to the shaft 16, 19 or may be curved (e.g. single curve, S-shaped). In embodiments where the inlet duct 74 has a curved shape an imaginary line may be defined as the straight line more closely corresponding to the curved central axis of the inlet duct 74; this imaginary line may be parallel to the shafts 16, 19 or extend at a non-zero angle with respect thereto. The radial offset of the turbine shaft 19 and of the inlet duct 74 with respect to the engine shaft 16 allows for the compressor and turbine modules 24, 28, inlet duct 74 and heat exchangers 96, 102 to be clockable around the engine shaft 16, i.e. to be disposed in a variety of angular positions around the engine shaft 16 to suit specific aircraft nacelle designs, as described above.

Referring to FIG. 10A, the compound engine assembly 210 also includes a mount cage 204 including angled struts 206, 206' connected to two opposed side mounts 105 attached to the casing 21 of the gearbox module 20 through an arcuate support 107, and angled struts 206" connected to a bottom mount 105' also attached to the engine assembly 210 through an additional arcuate support 207 axially spaced from the first arcuate support 107, for example configured to support the reduction gearbox module 220. In this embodiment, the mount cage 204 includes on each side first and second struts 206, 206' connected to the corresponding side mount 105, and a third strut 106" connected to the bottom mount 105'. The first and second struts 206, 206' extending from the same side mount 105 are angled with respect to one another such as to extend further apart from each other as distance from the side mount 105 increases. The first strut 206 is configured to be connected to the corresponding upper aircraft mount point 108, while the second and third struts 206', 206" are configured to be connected to the corresponding lower aircraft mount point 108'. A link 209 is provided on each side to interconnect the two arcuate supports 107, 207.

As described above, in a particular embodiment the mount cage 204 and the mounts 105 are separated from the turbine module 28, core module 22 and exhaust pipes 30 by the firewall 63. Moreover, since in this embodiment the third struts 206" and the links 209 extend to side of the firewall 63 where the hot zone (e.g. turbine module 28, exhaust pipes 30 and part of the core module 22 adjacent the exhaust pipes 30) is located, a firewall extends transversely to the firewall 63, between the elements of the mount cage 204 (struts 206" and links 209) and the exhaust pipes 30, i.e. between the elements of the mount cage 204 and the hot zone. Depending on their position, this firewall may be one of the firewalls 65, 67 previously described, or an additional firewall 165 (as shown).

In the embodiment shown, the mount cage 204 and the mounts 105, 105' are located out of the hot zone. The mount cage 204, including the struts 206, 206', 206", as well as the mounts 105, 105' are separated from the turbine module 28, exhaust pipes 30 and part of the core module 22 adjacent the exhaust pipes 30 by the firewalls 63 and 165. Accordingly, the struts 206, 206', 206" are not challenged by the hot temperature of the turbine module 28, exhaust pipes 30 and core module 22, which may help improve the structural integrity of the mount cage 204 and of its connection with the engine assembly 210.

It is understood that the configuration of the mount cage of the engine assembly 201 may differ from that shown; for example, the mount cage 104 of FIG. 4 may be used with the engine assembly 210. Similarly, the mount cage 204 of FIG. 10A may be used with the engine assembly 10. Other configurations are also possible. For example, the mount cage 104, 204 may include additional struts.

Figure 12:
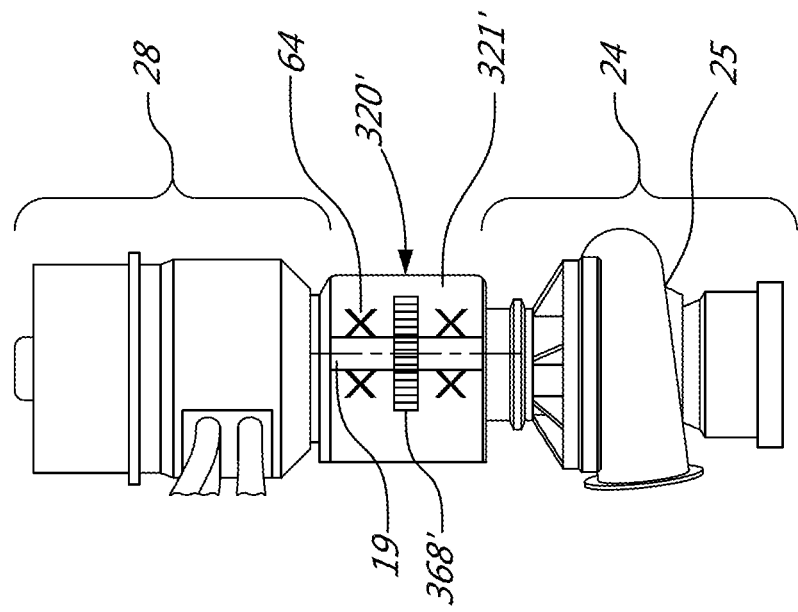
FIG. 12 is a schematic side view of part of the compound engine assembly of FIG. 11.
Figure 11:
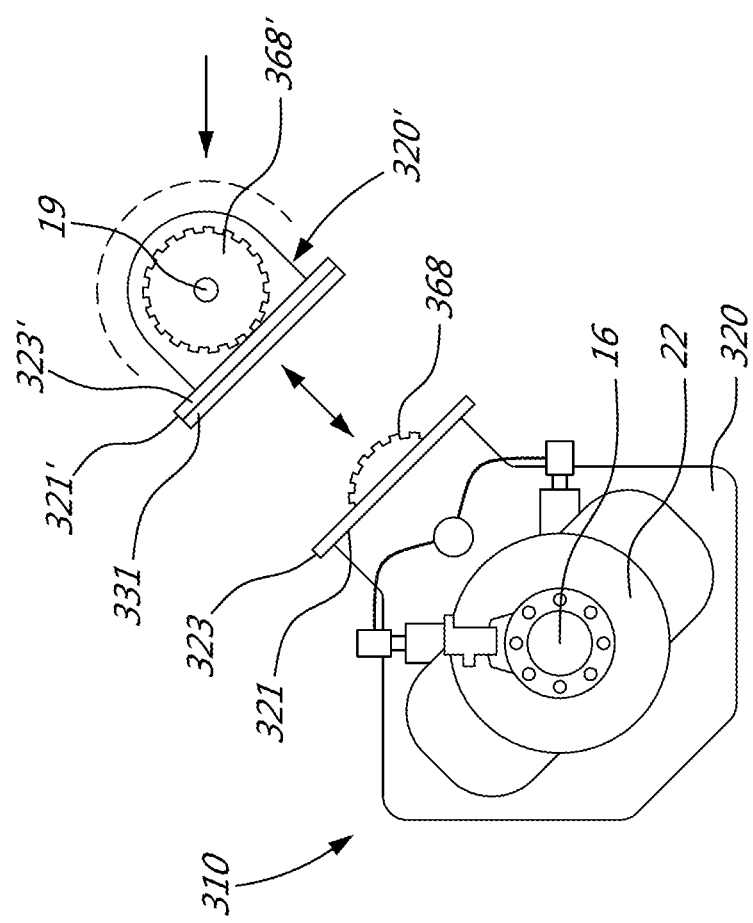
FIG. 11 is a schematic, exploded end view of a compound engine assembly in accordance with another particular embodiment.

Referring to FIGS. 11-12, a compound engine assembly 310 according to an alternate embodiment is shown, where elements similar to or identical to the corresponding elements of the compound engine assemblies 10, 210 are identified by the same reference numerals and will not be further described herein. The compound engine assembly 310 is configured as a reversed flow single shaft engine and includes four (4) major modules: the core module 22, the cold section/compressor module 24, the hot section/turbine module 28, and the gearbox module including first and second sub-modules or parts 320, 320' which cooperate to together define a module similar to the gearbox module 20 previously described. Although not shown, the compound engine assembly 310 could be configured as a turboprop engine with a reduction gearbox module.

In a particular embodiment, the compound engine assembly 310 is, aside from its gearbox module 320, 320' configured similarly or identically to the compound engine assembly 10 or to the compound engine assembly 210 previously described; it is accordingly understood that any element and combination of elements of the assemblies 10, 210 as previously described, can be used in the assembly 310.

The first part 320 of the gearbox module includes a casing 321 containing (e.g. enclosing) a first part 368 of the compounding gear train (shown here as a pinion gear), and the second part 320' of the gearbox module includes a casing 321' containing a complementary part 368' of the compounding gear train. The two gearbox module casings 321, 321' are detachably interconnected; in the embodiment shown, the casings 321, 321' include complementary flanges 323, 323' which are bolted together with a setting spacer 331 therebetween. However, any other suitable type of connection may be used, including but not limited to those described above.

The turbine shaft 19, to which the rotors of the turbine module 28 and of the compressor module 24 are connected to (e.g. rigidly connected to, integrally formed with, attached to, or any other type of connection allowing the rotors to rotate together with the shaft at a same speed), extends through the second part 320' of the gearbox module. The parts 368, 368' of the compounding gear train cooperate to mechanically link and in drivingly engage the turbine shaft 19 to the engine shaft 16. The rotors of the turbine module 28 and of the compressor module 24 are cantilevered, and the bearings 64 supporting the turbine shaft 19 are contained within the casing 321' of the second part 320' of the gearbox module, without additional bearings being provided outside of the gearbox module. Alternately, the turbine module 28 and of the compressor module 24 can each have their own dedicated shaft. The compressor module 24 and turbine module 28 do not include bearings, and are thus not part of the bearing lubricant circulation system, which is contained within the second gearbox module casing 321'.

The compressor module casing 25 is located outside of the gearbox module casings 321, 321', and is mounted on a face of the second gearbox module casing 321' (e.g. detachably interconnected through any suitable type of connection, including but not limited to those described above). The turbine module casing 29 is also located outside of the gearbox module casings 321, 321', and is mounted on the face of the second gearbox module casing 321' opposite that receiving the compressor module casing 25 (e.g. detachably interconnected through any suitable type of connection, including but not limited to those described above).

The first part 320 of the gearbox module includes one or more accessory gear train(s) (not shown) contained in the first gearbox module casing 321. Accessories (not shown) are engaged mounted on a face of the first gearbox module casing 321 on a same side of the gearbox module 320, 320' as the compressor module 25.

The separate gearbox module casings 321, 321' may allow the turbine module 28, compressor module 24 and second part 320' of the gearbox module to be separated from the remainder of the engine 310 while remaining interconnected to one another to define a "turbo machinery module" which may be replaced, or serviced independently of the remainder of the engine 310.

In a particular embodiment, the separate gearbox module casings 321, 321' allows the second casing 321' adjacent the turbine module 28 to be made of material more resistant to heat than that of the first casing 321, which may help minimize cooling requirements and/or thermal protection requirement, as opposed to a single gearbox module casing completely made of the material of the first casing 321. In a particular embodiment, the first casing 321 is made of aluminium, and the second casing 321' is made of steel.

Although not shown, the engine 310 includes mounts for engagement with a mounting structure, such as a mount cage 104, 204 as previously described. In a particular embodiment, the mounts are connected to the first gearbox module casing 321.

Although examples of the compound engine assembly 10, 210, 310 have been shown as turboshaft and turboprop engine assemblies, it is understood that the compound engine assemblies can be designed for other uses, including, but not limited to, to be used as an auxiliary power unit.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A compound engine assembly comprising:
an engine core including at least one internal combustion engine in driving engagement with an engine shaft;
a turbine section having an inlet in fluid communication with an outlet of the engine core through at least one exhaust pipe, the turbine section including at least one turbine rotor connected to a turbine shaft, the turbine shaft in driving engagement with the engine shaft;
a compressor having an outlet in fluid communication with an inlet of the engine core, the compressor including at least one compressor rotor in driving engagement with at least one of the turbine shaft or the engine shaft;
a casing connected to each of the turbine section, the compressor, and the engine core; and
a mount cage including a plurality of struts connected to mounts attached to the casing outside of a hot zone of the compound engine assembly in which the turbine section, the at least one exhaust pipe, and a part of the engine core adjacent the at least one exhaust pipe are disposed, the plurality of struts being separated from the hot zone by at least one firewall.

2. The compound engine assembly as defined in claim 1, wherein all of the struts extend from the mounts away from the turbine section and engine core.

3. The compound engine assembly as defined in claim 1, wherein the casing is a casing of a gearbox module, the compressor being located on one side of the casing, the turbine section and engine core being located on the opposed side of the casing, the turbine shaft extending through the gearbox module and being in driving engagement with the engine shaft through a gear train of the gearbox module, the at least one compressor rotor being connected to the turbine shaft.

4. The compound engine assembly as defined in claim 1, wherein the at least one firewall includes a first firewall extending radially outwardly from the casing, the first firewall being located between the mounts and the hot zone.

5. The compound engine assembly as defined in claim 1, wherein the compressor is located on one side of the casing, the hot zone being located on the opposed side of the casing, the at least one firewall includes a first firewall extending radially outwardly from the casing between the mounts and the hot zone, the plurality of struts including at least one strut extending on a same side of the first firewall as the hot zone, the at least one firewall including a second firewall extending transversely from the first firewall between the at least one strut and the hot zone.

6. The compound engine assembly as defined in claim 1, wherein the mounts includes two side mounts connected to opposite sides of the casing, and a bottom mount, and the plurality of struts includes, on each side of the mount cage:
two struts extending from a corresponding one of the two side mounts for connection to two different aircraft mount points, the two struts being angled with respect to one another such as to extend further away from each other as a distance from the side mount increases, and
an additional strut extending from the bottom mount for connection to one of the two different aircraft mount points.

7. The compound engine assembly as defined in claim 1, wherein each of the at least one internal combustion engine includes a rotor sealingly and rotationally received within a respective internal cavity to provide rotating chambers of variable volume in the respective internal cavity, the rotor having three apex portions separating the rotating chambers and mounted for eccentric revolutions within the respective internal cavity, the respective internal cavity having an epitrochoid shape with two lobes.

8. The compound engine assembly as defined in claim 1, wherein the turbine section includes a first stage turbine having an inlet in fluid communication with the outlet of the engine core, and a second stage turbine having an inlet in fluid communication with an outlet of the first stage turbine.

9. The compound engine assembly as defined in claim 7, wherein the first stage turbine is configured as an impulse turbine with a pressure-based reaction ratio having a value of at most 0.2, the second stage turbine having a higher pressure-based reaction ratio than that of the first stage turbine.

10. A compound engine assembly comprising:
an engine core including at least one internal combustion engine in driving engagement with an engine shaft;
a gearbox module including a gearbox module casing containing at least one gear train;
a turbine section outside of the gearbox module casing, the turbine section having an inlet in fluid communication with an outlet of the engine core through at least one exhaust pipe, the turbine section including at least one turbine rotor connected to a turbine shaft, the turbine shaft in driving engagement with the engine shaft through one of the at least one gear train of the gearbox module;
a compressor outside of the gearbox module casing, the compressor having an outlet in fluid communication with an inlet of the engine core, the compressor including at least one compressor rotor in driving engagement with at least one of the turbine shaft and the engine shaft;
wherein the turbine section and the engine core are located on a same side of the gearbox module casing and the compressor is located on the opposite side of the gearbox module casing; and a mount cage connected to the casing, the mount cage completely separated from the turbine section and the at least one exhaust pipe by at least one firewall.

11. The compound engine assembly as defined in claim 10, wherein the mount cage is completely contained within an axial space extending axially from a first location at a cold side of the compound engine assembly to a second location on the gearbox module casing, the turbine section and engine core being located outside of the axial space.

12. The compound engine assembly as defined in claim 10, wherein the at least one firewall includes a first firewall extending radially outwardly from the gearbox module casing, the turbine section and engine core being located on a same side of the first firewall and the compressor and the mount cage being located on the opposite side of the first firewall, the mount cage including at least one strut extending on a same side of the first firewall as the turbine section and engine core, the at least one firewall including a second firewall extending transversely from the first firewall between the at least one strut and the turbine section and between the at least one strut and the at least one exhaust pipe.

13. The compound engine assembly as defined in claim 11, wherein the mount cage includes a plurality of struts all extending from the gearbox module casing toward the cold side of the compound engine assembly.

14. The compound engine assembly as defined in claim 10, wherein the mounts cage includes, on each side thereof:
first and second struts extending from a same side mount connected to the gearbox casing for connection to two different aircraft mount points, the first and second struts being angled with respect to one another such as to extend further away from each other as a distance from the side mount increases, and
a third strut extending from a bottom mount for connection to one of the two different aircraft mount points.

15. The compound engine assembly as defined in claim 14, wherein each side mount is connected to the gearbox casing through an additional support extending under the gearbox module.

16. The compound engine assembly as defined in claim 10, wherein each of the at least one internal combustion engine includes a combustion engine rotor sealingly and rotationally received within a respective internal cavity to provide rotating chambers of variable volume in the respective internal cavity, the combustion engine rotor having three apex portions separating the rotating chambers and mounted for eccentric revolutions within the respective internal cavity, the respective internal cavity having an epitrochoid shape with two lobes.

17. The compound engine assembly as defined in claim 10, wherein the at least one compressor rotor is connected to the turbine shaft, the turbine shaft extending through the gearbox module.

18. The compound engine assembly as defined in claim 10, wherein the turbine section includes a first stage turbine having an inlet in fluid communication with the outlet of the engine core, and a second stage turbine having an inlet in fluid communication with an outlet of the first stage turbine.

19. The compound engine assembly as defined in claim 18, wherein the first stage turbine is configured as an impulse turbine with a pressure-based reaction ratio having a value of at most 0.2, the second stage turbine having a higher reaction ratio than that of the first stage turbine.

20. The compound engine assembly as defined in claim 10, wherein the turbine shaft and the engine shaft are parallel and radially offset from one another.

* * * * *